United States Patent
Fourspring et al.

(10) Patent No.: US 10,666,878 B1
(45) Date of Patent: May 26, 2020

(54) IMAGING APPARATUS HAVING MICRO-ELECTRO-MECHANICAL SYSTEM (MEMS) OPTICAL DEVICE FOR SPECTRAL AND TEMPORAL IMAGING AND ASSOCIATED METHODS

(71) Applicant: EAGLE TECHNOLOGY, LLC, Melbourne, FL (US)

(72) Inventors: Kenneth D. Fourspring, Greece, NY (US); Matthew Pellechia, Hilton, NY (US); Jeffrey D. Newman, Pittsford, NY (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 16/378,684

(22) Filed: Apr. 9, 2019

(51) Int. Cl.
| | |
|---|---|
| H04N 5/265 | (2006.01) |
| H04N 5/268 | (2006.01) |
| H04N 5/225 | (2006.01) |
| G01J 3/02 | (2006.01) |
| G01J 3/28 | (2006.01) |
| G02B 26/08 | (2006.01) |
| H04N 5/235 | (2006.01) |

(52) U.S. Cl.
CPC .............. *H04N 5/265* (2013.01); *G01J 3/021* (2013.01); *G01J 3/2823* (2013.01); *G02B 26/0833* (2013.01); *H04N 5/2258* (2013.01); *H04N 5/2353* (2013.01); *H04N 5/268* (2013.01); *G01J 2003/2826* (2013.01)

(58) Field of Classification Search
None
See application file for complete search history.

(56) References Cited

U.S. PATENT DOCUMENTS

| | | | |
|---|---|---|---|
| 7,219,086 B2 | 5/2007 | Geshwind et al. |
| 7,274,454 B2 | 9/2007 | Kowarz et al. |
| 7,289,209 B2 | 10/2007 | Kowarz et al. |
| 7,557,918 B1 | 7/2009 | Newman et al. |
| 8,284,405 B1 | 10/2012 | Clark |
| 8,305,575 B1 | 11/2012 | Goldstein et al. |
| 8,316,753 B2 | 11/2012 | Beach et al. |
| 8,351,031 B2 | 1/2013 | Fox et al. |
| 8,488,123 B1 | 7/2013 | Clark |

(Continued)

OTHER PUBLICATIONS

Goldstein et al., "DMD-Based Adaptive Spectral Imagers for Hyperspectral Imagery and Direct Detection of Spectral Signatures," Proceedings of SPIE; The International Society for Optical Engineering; Feb. 2009; pp. 1-10.

(Continued)

*Primary Examiner* — Fernando Alcon
(74) *Attorney, Agent, or Firm* — Allen, Dyer, Doppelt + Gilchrist, P.A. Attorneys at Law (57) ABSTRACT

An imaging apparatus includes a micro-electro-mechanical system (MEMs) optical device that is operable to switch an optical image input path between first and second optical image output paths. A spectral imaging sensor is aligned with the first optical image output path and an imaging sensor is aligned with the second optical image output path. A multiplexing controller is configured to selectively operate the MEMs optical device to alternatingly collect spectral image data from the spectral imaging sensor and image data from the imaging sensor.

23 Claims, 6 Drawing Sheets

(56) References Cited

U.S. PATENT DOCUMENTS

| | | | |
|---|---|---|---|
| 8,810,650 B1* | 8/2014 | Neumann | G01J 3/0289 |
| | | | 348/142 |
| 9,025,024 B2 | 5/2015 | Xu et al. | |
| 9,117,133 B2 | 8/2015 | Barnes et al. | |
| 9,726,487 B2 | 8/2017 | Biesemans et al. | |
| 2005/0007450 A1 | 1/2005 | Hill et al. | |
| 2005/0237423 A1 | 10/2005 | Nilson et al. | |
| 2005/0275847 A1 | 12/2005 | Moshe | |
| 2013/0194481 A1* | 8/2013 | Golub | H04N 9/045 |
| | | | 348/336 |
| 2014/0301662 A1 | 10/2014 | Justice et al. | |
| 2015/0015692 A1 | 1/2015 | Smart | |
| 2015/0146278 A1* | 5/2015 | Thomas | G02B 17/0812 |
| | | | 359/292 |
| 2015/0185079 A1 | 7/2015 | Justice et al. | |
| 2017/0059408 A1* | 3/2017 | Korner | G01B 11/2536 |
| 2017/0138733 A1 | 5/2017 | Michiels et al. | |
| 2017/0176338 A1* | 6/2017 | Wu | G01J 3/18 |
| 2018/0135970 A1* | 5/2018 | Mazumdar | G02B 7/182 |
| 2019/0310199 A1* | 10/2019 | Santori | G01J 3/0224 |
| 2019/0363116 A1* | 11/2019 | Raz | H04N 5/332 |
| 2019/0384049 A1* | 12/2019 | Gaiduk | G02B 26/0833 |

OTHER PUBLICATIONS

King et al., "Performance and Applications of a Hypertemporal Hyperspectral Fourier-Transform Infrared Spectroradiometer," SPIE Defense, Security and Sensing Conference; Proceedings vol. 7319; Next-Generation Spectroscopic Technologies II; Apr. 28, 2009; Abstract Only; 1 page.

Meyer et al., "RITMOS: A Micromirror-Based Multi-Object Spectrometer," Proceedings of the SPIE; 2004; pp. 1-20.

Newman et al., "MEMS Programmable Spectral Imaging for Remote Sensing," The International Society for Optical Engineering; SPIE Newsroom; 2006; pp. 1-3.

Spectral Sciences, Inc., Burlington, MA; "4D Spectral and Temporal Imaging," and "Spectral and Temporal Imaging," downloaded from the Internet on Mar. 18, 2019; http://www.spectral.com/; 11 pages.

Texas Instruments, Benjamin Lee; "Introduction to +/−12 Degree Orthogonal Digital Micromirror Devices (DMDs)," Chapters 1-4; DLPA008B; Jul. 2008; Revised Feb. 2018; pp. 1-13.

Jeganathan, "Hyperspectral and Hypertemporal Longwave Infrared Data Characterization," Rochester Institute of Technology; Thesis; Aug. 2017; 129 pages.

* cited by examiner

IMAGING APPARATUS HAVING MICRO-ELECTRO-MECHANICAL SYSTEM (MEMS) OPTICAL DEVICE FOR SPECTRAL AND TEMPORAL IMAGING AND ASSOCIATED METHODS

FIELD OF THE INVENTION

The present invention relates to imaging sensors, and more particularly, this invention relates to spectral imaging across the electromagnetic spectrum and temporal imaging and related imaging methods.

BACKGROUND OF THE INVENTION

Spectral imaging sensors capture and process multiple wavelength bands across the electromagnetic spectrum, as compared to an ordinary camera or imaging sensor that captures light across the visible spectrum formed of red, green and blue (RGB) wavelengths. Spectral imaging may incorporate the infrared, the visible spectrum, ultraviolet, x-rays and a combination of image data in the visible and non-visible bands simultaneously. Hyperspectral imaging is an extension of normal spectral imaging and considered by those skilled in the art to combine spectroscopy and digital photography, allowing data collection for the complete spectrum and possibly additional information about the subject material properties. In hyperspectral imaging, the complete spectrum over hundreds of narrow wavelength bands is collected at every pixel in an image plane. Special hyperspectral imaging sensors or cameras include spectrometers that capture hundreds of wavelength bands for each pixel, which are interpreted as the complete spectrum. The spectral image data from a hyperspectral imaging sensor has a fine wavelength resolution (typically 1, 5 or 20 nm spectral resolution), covers a wide range of wavelengths, and may measure continuous spectral bands. Because certain objects leave unique spectral "fingerprints" in the electromagnetic spectrum, also called "spectral signatures," these spectral fingerprints enable identification and analysis of materials that make up a scanned object. For example, a spectral fingerprint or signature for oil may help geologists find new oil fields. Likewise, the spectral signature for a certain type of metal or alloy may help engineers identify structural and material characteristics in a bridge and the structural and material differences among various sections in the bridge.

Temporal imaging or temporal characterization, as it is sometimes called, occurs when a series of images are taken at different times. The correlation between those images is often used to monitor the dynamic changes of the object. The term hypertemporal imaging usually refers to very high temporal resolution images that can detect high frequency intensity time varying changes. For example, a hypertemporal imaging system may detect minute structural changes, such as vibration signatures in a bridge. By processing these vibrations over time, it may be possible to determine if there is some material instability or weakness, depending on the material characteristics of the bridge construction in that area of the bridge where the vibrational changes are being analyzed on a pixel by pixel basis. It may also be possible to detect vibration signatures of vehicles and machinery to monitor their health and status. Other possibilities include characterizing surface and subsurface defects in the earth or in large objects.

SUMMARY OF THE INVENTION

An imaging apparatus comprises a micro-electro-mechanical system (MEMs) optical device that is operable to switch an optical image input path between first and second optical image output paths. A spectral imaging sensor is aligned with the first optical image output path and an imaging sensor is aligned with the second optical image output path. A multiplexing controller is configured to selectively operate the MEMs optical device to alternatingly collect spectral image data from the spectral imaging sensor and image data from the imaging sensor.

In an example, the MEMs optical device may comprise a digital micromirror device (DMD) or Grating Electro-Mechanical System (GEMS) and may be configured to perform optical modulation of the input signal. The spectral imaging sensor may comprise a hyperspectral imaging sensor and the imaging sensor may comprise a hypertemporal imaging sensor. At least one first optical element may be in the first optical image output path, and the at least one first optical element may comprise a grating, a prism, or a dispersion element. At least one second optical element may be in the second optical image output path, and the at least one second optical element may comprise a filter and at least one lens. An optical tube assembly may be aligned with the MEMs optical device.

An imaging method may comprise using a multiplexing controller to selectively operate a MEMs optical device to switch an optical image input path between first and second optical image output paths to alternatingly collect spectral image data from a spectral imaging sensor along the first optical image output path, and image data from an imaging sensor along the second optical image output path.

DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
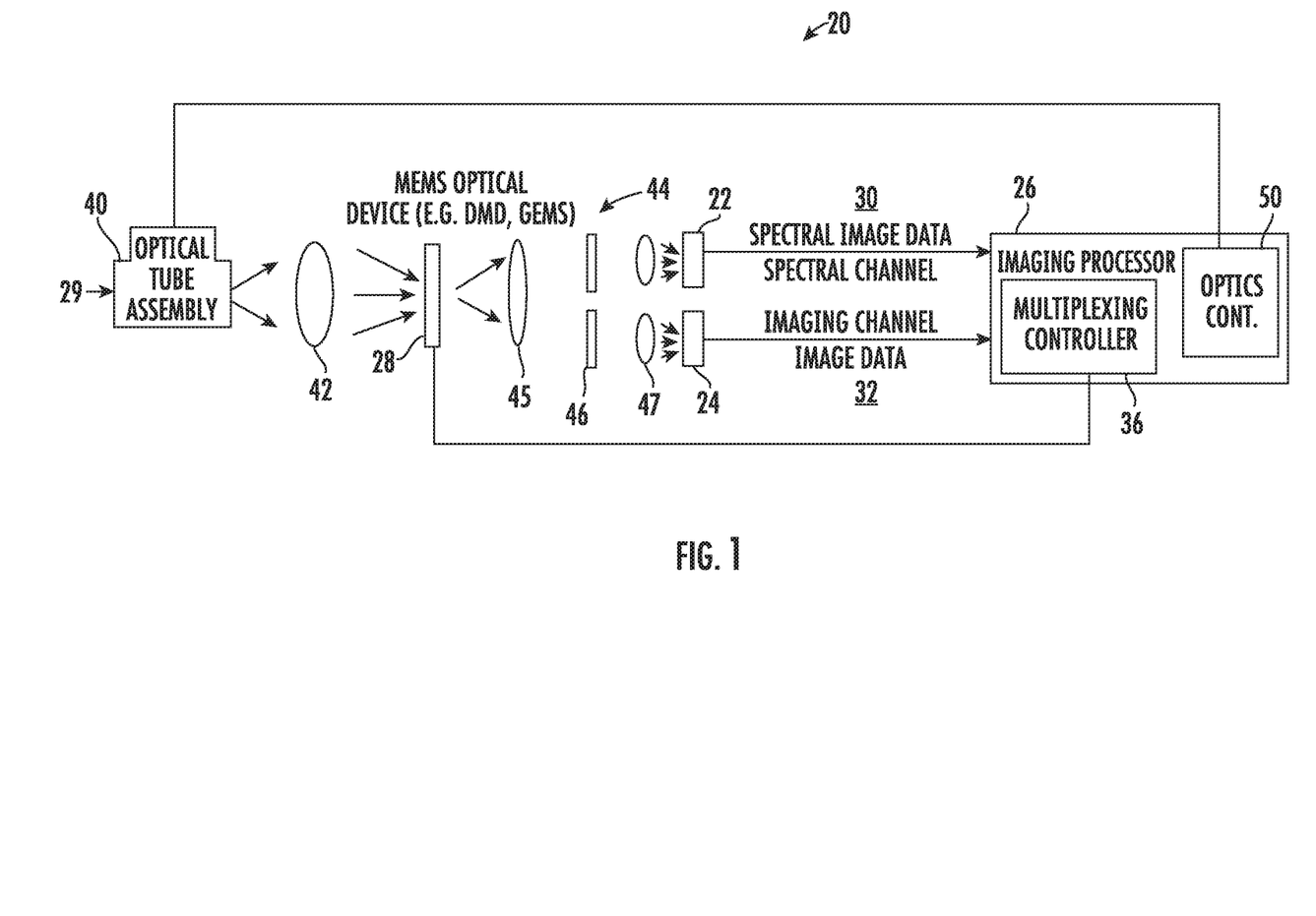
FIG. 1 is a block diagram showing an example of the imaging apparatus according to the invention.

Referring now to FIG. 1, there is illustrated a block diagram of the imaging apparatus indicated generally at 20, and operative as a single sensor package that incorporates a spectral imaging sensor 22, which in one embodiment is a hyperspectral imaging sensor, and an imaging sensor 24, which in one embodiment is a hypertemporal imaging sensor. It is possible to use "n" temporal or "n" spectral sensors. The hyperspectral imaging sensor 22 may collect data about the complete spectrum at every pixel of an image plane in the sensor, thus capturing hundreds of wavelength bands for every pixel. The bandwidth of multiple bands may be reduced compared to normal spectral imaging systems, while increasing the number of bands, i.e., up to hundreds of small bandwidth bands across the frequency spectrum.

The hyperspectral imaging sensor 22 may record very minute spectral characteristics of an object with a broader time interval and at a fine wavelength resolution. The hypertemporal imaging sensor 24, on the other hand, may collect data a greater number of times for an object with very narrow time spans, as compared to conventional temporal imaging to determine small or minute changes in the object. An example could be imaging minute vibrations in a bridge or similar structure, for example.

The imaging apparatus 20 includes an imaging processor 26 that collects the time coincident data from both the hyperspectral imaging sensor 22 and the hypertemporal imaging sensor 24 in a single platform or sensor package to define unique target spectral signatures and identify targets of interest, and allow a more enhanced analysis of objects such as a bridge or similar structure. The imaging apparatus 20 may not only determine the material or composition of sections of the bridge, but also determine minute structural changes in the bridge indicative of its stability based on vibration signatures. Further processing and analysis of image data from both the hyperspectral imaging sensor 22 and hypertemporal imaging sensor 24 may determine when certain sections of the bridge may have been adversely affected by heat or cold, perhaps made more brittle, and determine if the amount of bridge vibration would warrant repair.

As illustrated, the imaging apparatus incorporates a micro-electro-mechanical system (MEMs) optical device 28 that is operable to switch an optical image input path 29 between first and second optical image output paths 30,32, with the illustrated spectral channel corresponding to the first optical image output path 30, and the imaging channel corresponding to the second optical image output path 32. The hyperspectral imaging sensor 22 is aligned with the first optical image output path 30 and the hypertemporal imaging sensor 24 is aligned with the second optical image output path 32. It is possible to compress a dynamic range by dithering the MEMs optical device 28 by selectively controlling exposure levels at either the spectral imaging sensor 22 or the imaging sensor 24.

A multiplexing controller 36, which in this example is part of the imaging processor 26, is connected to the MEMs optical device 28 and configured to selectively operate the MEMs optical device to alternatingly collect spectral image data from the spectral imaging sensor 22 and image data from the imaging sensor 24, which in these examples are the hyperspectral imaging sensor and hypertemporal imaging sensor.

In this example, an optical tube assembly 40, such as a telescope or other optical tracking and magnification device, is aligned with the MEMs optical device 28 and focuses light in the example of FIG. 1 via a lens 42 into the MEMs optical device 28, which then passes light through secondary optics shown schematically at 44. The secondary optics 44 may include a collimating lens 45, a diffraction grating 46, and reimaging optics 47, and pass light into the respective hyperspectral imaging sensor 22 aligned with the first optical image output path 30 and the hypertemporal imaging sensor 24, aligned with the second optical image output path 32. An optics controller 50, for example, as part of the imaging processor 26, may be connected to the optical tube assembly 40, in this example, the telescope for tracking and ensuring high accuracy imaging of a specific object or section of an object, such as a section of a bridge.

As noted before, the multiplexing controller 36 is operatively connected to the MEMs optical device 28 and configured to selectively operate the MEMs optical device to alternatingly collect spectral image data from the hyperspectral imaging sensor 22 and image data from the hypertemporal imaging sensor 24. Data received from both sensors 22,24 is received within the imaging processor 26 that includes the multiplexing controller 36 and processes the spectral image data from the hyperspectral imaging sensor and image data from the hypertemporal imaging sensor and processes that data for an end use analysis, such as analyzing a bridge for structural failure.

An example MEMs optical device 28 may include a digital micromirror device (DMD) that may contain an array of highly reflective micromirrors, for example, aluminum micromirrors, each mirror corresponding to a pixel. Numerous rows, blocks or frames of data are loaded to an entire DMD array as part of the MEMs optical device 28, such that each DMD pixel corresponds to an electro-mechanical element having in an example two stable micromirror states, e.g., +12° and −12° that are determined by geometry and electrostatics of the pixel during operation and operate a spatial light modulator (not shown) in an example. The positive (+) 12° state could be tilted toward illumination and may be referred to as the "on" state, and the negative (−) 12° state could be tilted away from the illumination and referred to as the "off" state. Below each micromirror operates as a single pixel is a memory cell, e.g., a dual CMOS memory element with states that are complementary. In an example, the DMD 28 as an array may have a resolution of 1020 by 768 rows. An example DMD is produced by Texas Instruments as a +/−12° orthogonal digital micromirror device.

The micromirror may be attached by a via to a hidden torsional hinge and the underside of the mirrors may contact spring tips attached to electrodes that, when powered, may alternate movement of the micromirror, in this case in the −12° or +12° state. As noted before, each pixel or micromirror includes a CMOS memory element or memory cell. It is possible to address rows forming the DMD either sequentially using an automatic counter or randomly by row address. Sequential addressing is useful when it is expected that most of the data in an image will change each time the device is loaded. Random addressing may be useful when it is expected that data will change only in a subject of rows. Various mirror clocking pulses can be applied to change the mechanical position of each mirror as a pixel.

Another example of a MEMs optical device 28 may incorporate the Grating Electromechanical System (GEMS) for light modulation and reflectance from Harris Corporation, which may split light into a spectral bandwidth and operate in conjunction with a transmission grating and patterned mirror for imaging. This optical GEMS system may include three lens groups that are arranged in a one-to-one-to-one imaging configuration with a patterned mirror and transmission volume phase grating placed near the common focus of all three lenses.

Figure 2:
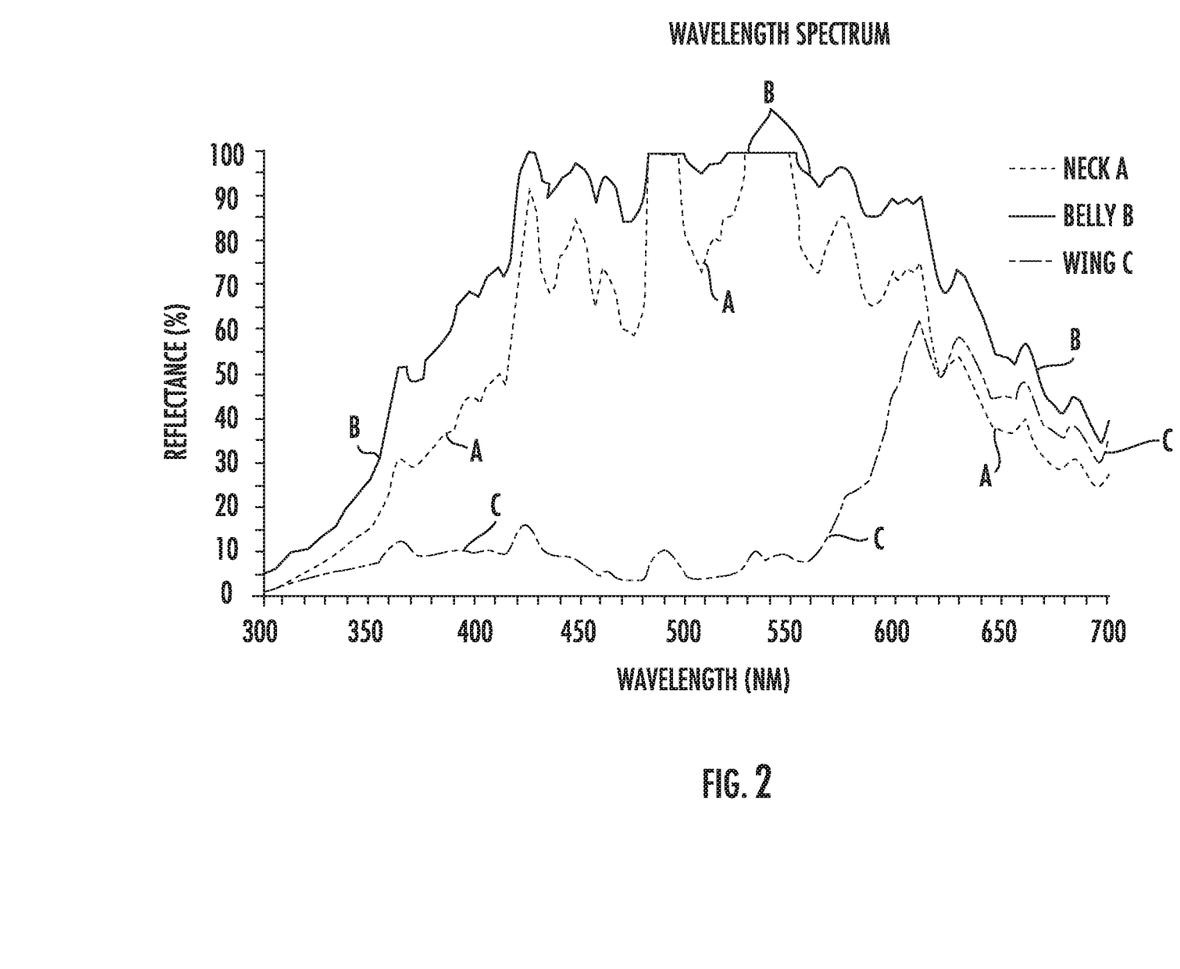
FIG. 2 is a graph of an example wavelength spectrum that the imaging apparatus of FIG. 1 may process.

The imaging apparatus 20 as described permits hyperspectral image data from the hyperspectral imaging sensor 22 and hypertemporal image data from the hypertemporal imaging sensor 24 to be collected at the same time. An example wavelength spectrum that can be processed for an object is shown in the graph of FIG. 2 and shows the wavelength versus reflectance of an object having a neck, belly and wing, such as an aircraft. The graph illustrates the wavelengths in nanometers versus the percentage of reflectance giving an entire wavelength spectrum to allow identification on various sections of the object and an analysis of various materials in the object, for example, areas that may be subject to more stress or formed from different alloys.

Figure 3:
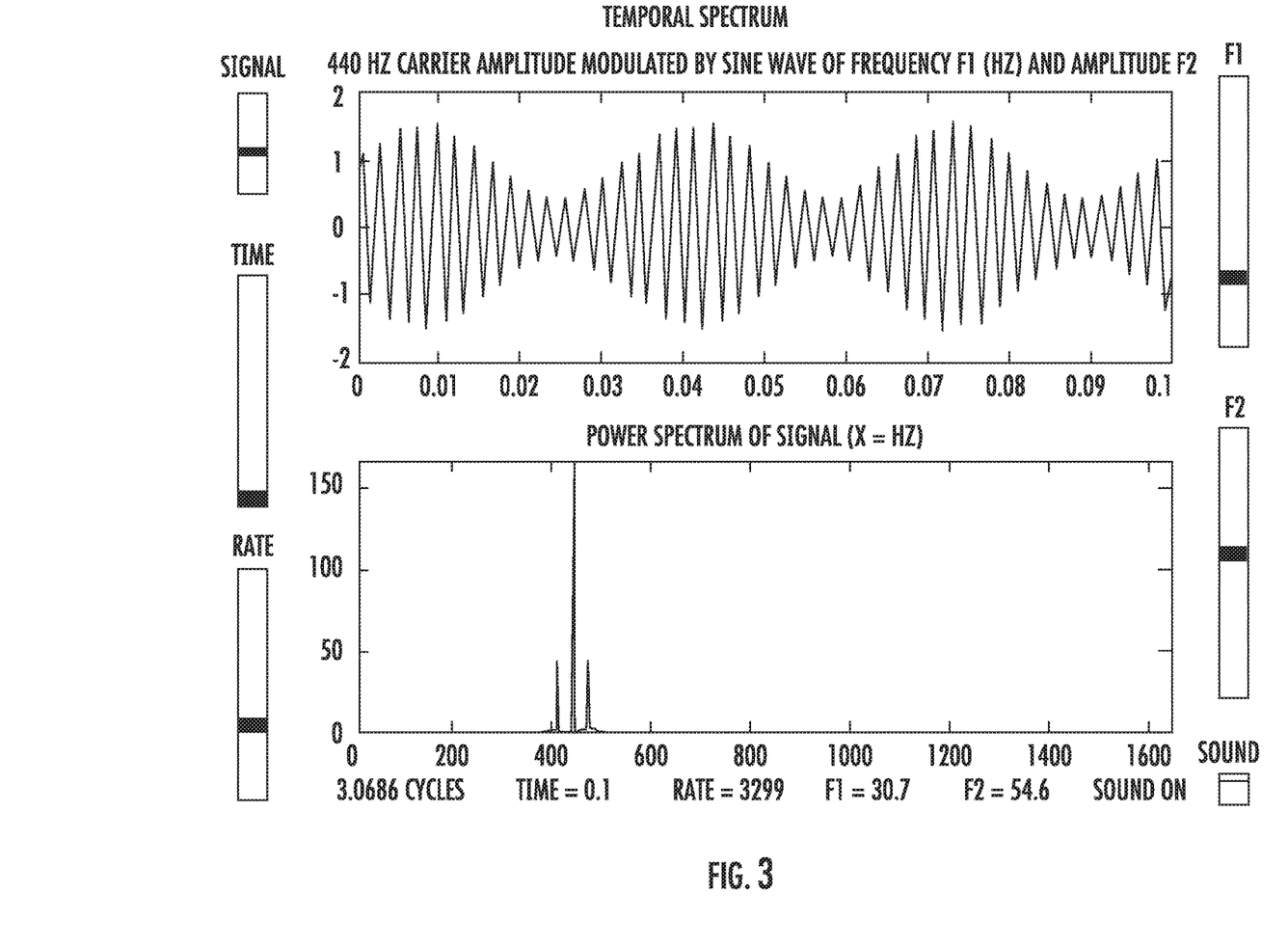
FIG. 3 is a graph of an example temporal spectrum that the imaging apparatus of FIG. 1 may process.

The graph of the temporal spectrum is shown in FIG. 3, showing a 440 Hz carrier amplitude modulated by the sine wave frequency F1 in Hertz and the amplitude F2, and the power spectrum of the signal. The various cycles may give an idea of vibration and change over time. Collected data from the hyperspectral imaging sensor 22 and hypertemporal imaging sensor 24 is processed at the same time within the imaging processor 26 so that the users of the imaging apparatus 20 have improved target identification and advanced analysis, such as determining when a bridge may collapse or sections of an aircraft are subject to undue stress.

Figure 4:
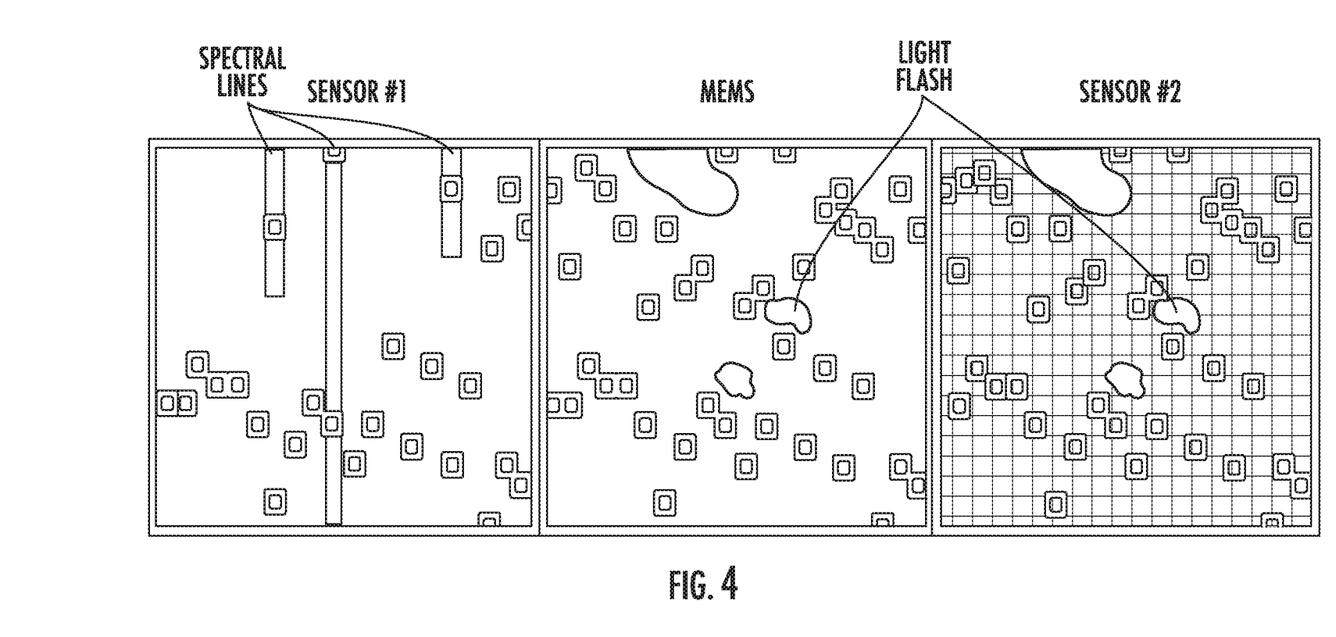
FIG. 4 shows real-time images of a selected portion of the spectral imaging sensor, imaging sensor and MEMs optical device in operation.

Referring now to FIG. 4, there are illustrated images taken in real time of small sections of both imaging sensors as Sensor 1 corresponding to the hyperspectral imaging sensor 22 and Sensor 2 as the hypertemporal imaging sensor 24 and a portion of a DMD mirror array as the MEMs optical device 28. These images show small pixelated rectangles and spectral lines in Sensor 1 as the hyperspectral imaging sensor 22 and areas of light flashes for the hypertemporal imaging sensor 24 as Sensor 2 and corresponding areas of the MEMs optical device 28 receiving energy as light.

Figure 5:
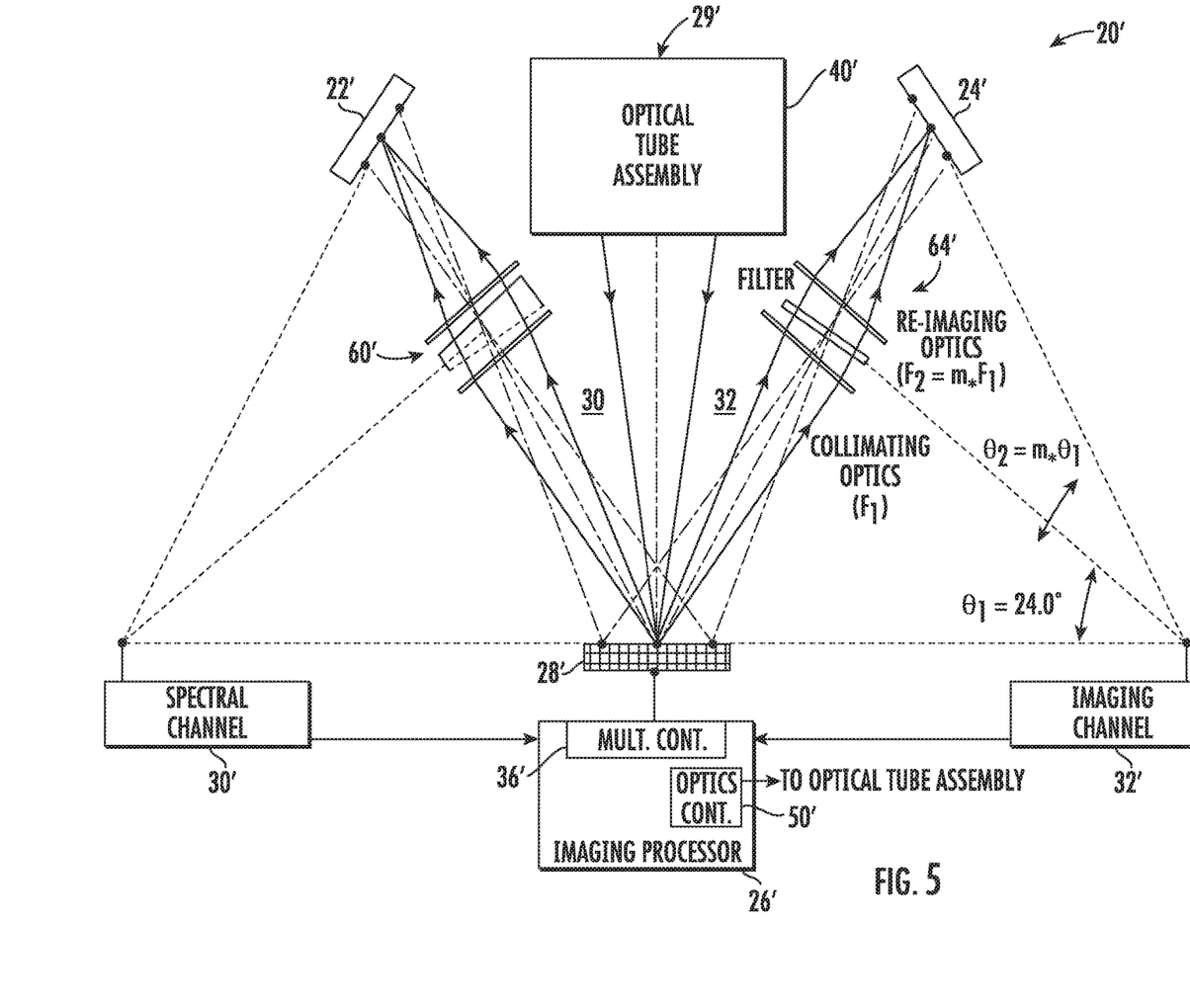
FIG. 5 is a more detailed schematic view of another embodiment of the imaging apparatus of FIG. 1.

Referring now to FIG. 5, there is illustrated another embodiment of an imaging apparatus 20', showing light generally coming from the COTA (Custom Optical Tube Assembly) type telescope as the optical tube assembly 40' and its alignment with the MEMs optical device 28' such as the DMD. In this example, the optical tube assembly 40' has a 400 to 900 nanometer spectrum as a telescope, an image size of about 25.0 by 25.0 millimeters, and a F/10 focal ratio corresponding to an average higher power and more narrow field of view. The MEMs optical device 28' as the DMD in this example may be a 2×4 or 4×4 array of separate DMD arrays. One DMD array correspond to the example of the MEMs optical device manufactured by Texas Instruments and described above, and having +/−12.0 degree surface tilts, a diagonal of either 0.7 inch or 1.4 inch, and a 7.6 micron pitch. Each pixel element includes a dual CMOS pixel memory element connected to and located behind each micromirror as described above, and with the connected multiplexing controller 36' configured to selectively operate the MEMs optical device 28' as the DMD and alternatingly collect spectral image data from the hyperspectral imaging sensor 22' and image data from the hypertemporal imaging sensor 24' by alternating the optical image input path 29' between first and second optical image output paths 30', 32'. As shown, at least one first optical element 60' is in the first optical image output path 30', and in this example, is formed as a grating prism also referred to by those skilled in the art as a Grism with optical specifications:

GRISM

Grating period g
Prism Angle A, index n $\lambda_0$ (center)~650 nm $\lambda_0 = (n-1)*A*g$ $d\theta/d\lambda = 1/g - A*(dn/d\lambda) \sim 1/g$ The first optical element 60' may also include a secondary optics such as an initial collimating lens as part of the Grism and reimaging optics so that the light signals are imaged on the hyperspectral imaging sensor 22'. Data is read out from the hyperspecial imaging sensor 22' into the first optical image output path 30' as a spectral channel and processed at the imaging processor 26'. It may be formed as a grating, prism or dispersion element, which may be switched to provide varying degrees of spectral resolution in the spectral imaging sensor 22'.

At the imaging channel, a second optical element 64' in the second optical image output path 32' may include a filter and at least one lens, such as a collimating lens before the filter and reimaging optics after the filter. Light is received at the imaging sensor 24' as the hypertemporal imaging sensor and image data processed at the imaging processor 26'.

The imaging apparatus 20' of FIG. 5 operates as a reflective system in this example, and in one non-limiting example, is operative in the 400 to 900 nanometer spectrum. This spectrum can be wider, e.g., 300 to 1,000 nm, but the 400 to 900 nanometer range has been found better in operation when working with a refractive system that includes optics having chromatism and good throughput and bulk transmittance and anti-reflection coatings, such as would be used with the optical apparatus 20' illustrated in FIG. 5. The 1 inch by 1 inch image size of a COTA-type optical telescope as the optical tube assembly 40' matches use of the DMD as part of an array and a 1.4 inch diagonal or a 2×2 array such as a 0.7 inch diagonal for each DMD. The magnification is set for each sensor and the Grism may deliver the desired bandwidth of about 5 to 10 nanometers.

It is possible to use a reflective, dispersive or diffractive MEMs optical device 28' in the imaging apparatus 20'. A diffractive MEMs optical device may modulate an incoming signal in an intermediate focal plane or in the Fourier plane at a frequency to reconstruct the temporal spectrum and switch between one or more electronic photodetector arrays or a spectrometer. Although multiplexing such as a time division multiplexing technique as described above may be used, it is possible to create a beat frequency that can be read out slowly by conventional CMOS imagers in one or more of the optical light paths.

Figure 6:
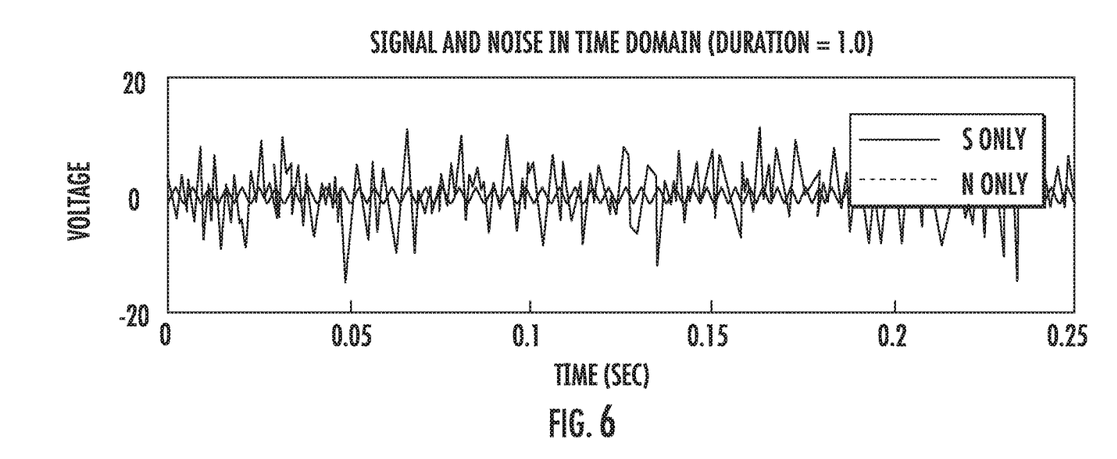
FIG. 6 is a graph showing an example of the signal and noise in the time domain as examples of signals that are processed at the imaging apparatus of FIG. 1.
Figure 7:
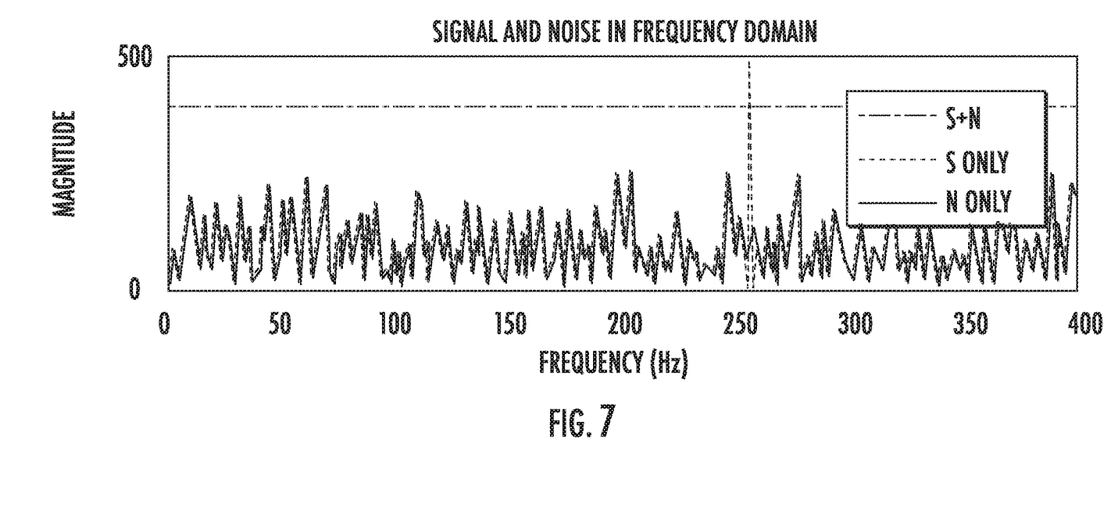
FIG. 7 is a graph similar to that of FIG. 6, but showing signal and noise in the frequency domain.

In an example type of processing, the imaging processor 26' operates with appropriate signal processing algorithms to achieve adequate signal detection and estimation. Signal samples are shown in the graphs of FIGS. 6 and 7, showing a signal and noise in the time domain (FIG. 6) and the signal and noise in the frequency domain (FIG. 7), and the types of signals with noise that the imaging apparatus 20' may process. Example techniques for signal detection are now explained. Techniques for Discrete Fourier Transform (DFT) signal detection and signal-to-noise (SNR) measurement such as on the example signals shown in the graphs of FIGS. 6 and 7, may use an arbitrary window function and zero-padding factor, $F_p$, as follows: [Note, $|S(f)|$ and $|N(f)|$ may be extracted from the spectrum of the combined signal and noise.]

Number of Signal Samples: $N_p = t_{observ} f_{cam} a_{tdm}^2$;
DFT window function RMS gain:

$$G_{w_{rms}} = \sqrt{\frac{1}{N_p} \sum_k w^2(k)};$$

DFT Window Function Amplitude Gain:

$$G_{w_{pk}} = \frac{1}{N_p} \sum_k w(k);$$

Root Mean Square (RMS) Signal:

$$s_{rms} = \frac{2\max(|S(f)|)}{\sqrt{2}\, N_p G_{w_{pk}}};$$

RMS Noise:

$$n_{rms} = \sigma_n = \frac{\sqrt{\sum_k |N(f)|^2}}{N_p \sqrt{F_p}\, G_{w_{rms}}} = \frac{\sqrt{\frac{1}{N_p F_p}\sum_k |N(f)|^2}}{\sqrt{N_p}\, G_{w_{rms}}} = \frac{\mathrm{RMS}(|N(f)|)}{\sqrt{N_p}\, G_{w_{rms}}};$$

Amplitude Spectrum SNR:

$$R_{spk\_nrms} = \frac{\max(|S(f)|)}{\mathrm{RMS}(|N(f)|)} = SNR_{DFTIN} \cdot \frac{\sqrt{N_p}\, G_{w_{pk}}}{\sqrt{2}\, G_{w_{rms}}};$$

Rayleigh Noise Amplitude Spectrum Quantile Point (e.g. P=0.999):

$$Q_P = \alpha\sqrt{-2\ln(1-P)} = \frac{\sigma_n \sqrt{N_p}\, G_{w_{rms}}}{\sqrt{2}}\sqrt{-2\ln(1-P)}\,;$$

Amplitude Spectrum Signal Detection Threshold (with margin $$m = 1.5): T_{R_{spk\_nrms}} = mQ_p = m\frac{\sigma_n \sqrt{N_p}\, G_{w_{rms}}}{\sqrt{2}}\sqrt{-2\ln(1-P)}\,;$$

and
Ratio of Amplitude Spectrum Signal to Detection Threshold:

$$R_{pk\_T} = \frac{\max(|S(f)|)}{T_{R_{spk\_nrms}}} = \left(\frac{1}{m}\right)\frac{\frac{A_e}{\sqrt{2}}}{\sqrt{N_e^2 + \frac{QSE^2}{12}}}$$

$$\mathrm{sinc}\!\left(\frac{f}{f_c a_{tdm}^2}\right)\sqrt{t_{observ} f_{cam} a_{tdm}^2}\left(\frac{G_{w_{pk}}}{G_{w_{rms}}}\right)\!\left(\frac{1}{\sqrt{-2\ln(1-P)}}\right)$$

It is also possible to use a Barycenter estimation of frequency, amplitude, and phase, using rectangular or Hann window processing without padding to reduce leakage in the discrete Fourier transforms, as follows:

For a rectangular window, $W_B=0$; for Hann, $W_B=1$;

$$i_{pk} = \mathrm{agrmax}(|S(f_i)|), f_i \leq 0 \text{ [negative frequencies]}$$

$$A_c = |S(f_{i_{pk}})|, A_l = |S(f_{i_{pk}-1})|, A_r = |S(f_{i_{pk}+1})|$$

$$\Delta_m = \begin{cases} \dfrac{A_r + W_B(A_r - A_c)}{A_r + A_c}, & A_r \geq A_l \\ \dfrac{-A_l + W_B(A_c - A_l)}{A_c + A_l}, & A_r < A_l \end{cases}$$

$$f_b = |f_{i_{pk}}| - \frac{\Delta_m f_s}{N_p} \text{ [assume } f_{i_{pk}} \text{ and } f_s \text{ are in Hz]};$$

$$A_b = 2|S(f_{i_{pk}})|\frac{1 - W_B \Delta_m^2}{N_p G_{w_{pk}} \mathrm{sinc}(\Delta_m)} \text{ [amplitude of sinusoid]};$$

$$\phi_b = -\angle[S(f_{i_{pk}})] + \Delta_m \pi \text{ [radians, phase at positive frequency]}.$$

As noted before, the MEMs optical device 28' uses the preferred multiplexing in conjunction with the multiplexing controller 36' to control the MEMs optical device. In an example, a camera as an imaging sensor may include a frame rate that incorporates the sampling rate, $f_s$. It may be assumed that the signal frequency is higher than $$\frac{f_s}{2},$$

so the signal aliases. In terms of the aliasing, mapping may occur from the input signal to the output signal and with repeat as the frequency increases. In a modulated system, multiplication by another signal may give the sum and difference frequencies, which difference may or may not be low enough to avoid aliasing. The sum may be higher than an original. For that reason, it may become aliased. It may not be possible to filter it before the camera.

In an example, it is possible to assume a priori knowledge of the signal frequency range that can be quantified, and thus, capture it with aliasing using one camera. It is also possible to measure the aliased frequency and phase. Using a priori knowledge and measurement, it is possible to determine the signal frequency and phase.

In a modulated system, the signal may be at HF (high enough to alias) and it is possible to vary the carrier frequency and show the sum and difference and show the resulting aliased frequencies. Without prior knowledge, it is not possible to know where the aliased frequency came from. With a priori knowledge, however, it is possible.

In a multiplexing system, it is possible to use multiple channels to increase the effective sampling rate. This requires that the system observe the same signal with multiple (or all) channels, and therefore, the source should illuminate all channels. A linear array of channels could be used, but with a digital micromirror device (DMD) as the MEMs optical device 28, a square array is preferable.

It should be understood that temporal signals may be characterized by their frequency spectra, $f_{signal}$ and cameras, i.e., imaging sensors, may be characterized by their frame rate (or sampling frequency, $f_{sampling}$).

There is a desire to measure $f_{signal}$ given $f_{sampling}$. When the sampling is slow for a given signal frequency aliasing may occur, indicating that the measured frequency does not match the actual frequency:

$$N = \left\lfloor \frac{f_{signal}}{f_{sampling}} + 0.5 \right\rfloor$$

$f_{measured} = f_{signal} - Nf_{sampling}$

The simpler case is when there is no aliasing:

$$|f_{measured}| < \frac{f_{sampling}}{2} \rightarrow N = 0 \rightarrow f_{measured} = f_{signal} \text{ (no aliasing)}.$$

A more challenging case is when the signal frequency is too high or the sampling frequency is too low:

$N \neq 0 \rightarrow f_{measured} \neq f_{signal}$ (aliasing).

It is possible to the use the modulation capability of the imaging processor 26 to achieve $f_{measured} = f_{signal}$ over a wider range of the $f_{signal}$.

Different techniques are possible, and one current approach has been found feasible. It should be understood that the amplitude modulation to shift $f_{signal}$ into range where no aliasing occurs, then the modulated signal may be sampled:

Signal: $s(t) = A_s \cos(2\pi f_{signal} t + \phi_{signal})$

Carrier: $c(t) = A_c \cos(2\pi f_c t + \phi_c)$

Modulated: $m(t) = s(t)c(t) = \frac{A_s A_c}{2}(\cos(2\pi(f_{signal} + f_c)t + \phi_{signal} + \phi_c) + \cos(2\pi(f_c - f_{signal})t + \phi_c - \phi_{signal}))$.

It can be observed: $f_c$ can be chosen such $$f_c - f_{signal} < \frac{f_{sampling}}{2},$$

to avoid aliasing, but $$f_{signal} + f_c > \frac{f_{sampling}}{2}$$

will alias into the results. Choosing $f_c$ to avoid aliasing requires knowledge of the range of $f_{signal}$. The sum frequency term, $f_{signal} + f_c$, may be attenuated due to an image sensor's integration time. The carrier phase $\phi_c$ could be known to determine the phase of the signal $\phi_{signal}$. If the image apparatus 20 has knowledge of the range of $f_{signal}$, the imaging processor 26 could determine N and then exactly determine $f_{signal}$ making modulation unnecessary.

In a first example, the camera rate is 60 Hz (measures up to 30 Hz), and the signal frequency is 172 Hz. The system aliases to 8 Hz. It may be desirable to handle frequencies of about 160 to 190 Hz and modulate the signal with 160 Hz. The difference frequency is 12 Hz with no aliasing.

The integration may attenuate to 0.9927. The sum frequency may be 332 Hz. The integration may attenuate to −0.0572, then aliases to 28 Hz. The system recovers 172 Hz by adding 160 Hz+12 Hz.

The modulation uses knowledge of the expected range of the signal's frequency. In this example, the sum frequency (332 Hz) is partially filtered out, but still gets aliased into the result. Frequencies outside the 30 Hz wide band from 160 to 190 usually may not be distinguished from those signals that are in-band.

In a second example, the camera rate is 60 Hz (measures up to 30 Hz) and the signal frequency is 172 Hz. The system aliases to 8 Hz. It is desirable to handle frequencies 150 Hz to 180 Hz and modulate the signal with 150 Hz. The difference frequency is 22 Hz with no aliasing.

The integration may attenuate to 0.7931. The sum frequency may be 322 Hz. The integration may attenuate to −0.0542, then aliases to 22 Hz (with a different phase). The system recovers 172 Hz by adding 150 Hz+22 Hz.

It should be understood that the modulation uses knowledge of the expected range of the signal's frequency. The sum frequency (332 Hz) is partially filtered out, but still gets aliased into the result. Frequencies outside the 30 Hz wide band from 160 to 190 Hz cannot be distinguished from those in the band.

As noted before with reference to the description of the imaging apparatus 20 of FIGS. 1 and 5, the multiplexing controller 36 as part of the imaging processor 26 is configured to selectively operate the MEMS optical device 28 and alternatingly collect spectral image data form the spectral imaging sensor as the preferred hyperspectral imaging sensor 22 and the image data from the imaging sensor as the preferred hypertemporal imaging sensor 24. Time-division multiplexing effectively boosts $f_{sampling}$. Channel "modulation" is used to divide camera frame integration time into $N_{channels}$ with shorter samples at known times. The on/off times of each channel may be individually synchronized relative to a sensor's frame rate.

Image data may be combined from individual channels into a densely sampled signal, effectively multiplying the sampling rate by $N_{channels}$. This requires that the signal illumination be dispersed across all (or many) channels to ensure the signal is sampled at each channel's time. This system has benefits because the effective frame rate of a sensor can be multiplied, allowing higher frequencies to be measured. This also requires less knowledge about the frequency of the signal being measured.

Possible disadvantages include dispersing the signal, which implies fewer sources can be imaged in the region of dispersion. This also shortens the total integration time and increases noise relative to the first method described above.

It should be understood that frequencies above $$N_{channels} \times \frac{f_{sampling}}{2}$$

will still alias, but the imaging apparatus may assume those frequencies are not present.

The imaging apparatus 20, 20' as described above has advantages by including the rapidly reconfigurable MEMs optical device 28, 28' with a single device and platform and onboard processing via the imaging processor 26, 26', which includes the multiplexing controller 36, 36' and optics controller 50, 50'. The imaging apparatus 20, 20' as encompassed in one device and platform has a lower cost than separate hyperspectral imaging systems and hypertemporal imaging systems with attempts to combine and synthesize their data. The MEMs optical device 28, 28' leverages semiconductor technology and eliminates high speed, large rotating mechanical components, and thus, not does use complex reaction force compensation. There is also no requirement for high voltage (potential) EMI components. The imaging apparatus 20, 20' also reduces the amount of data required to be processed electronically as compared to merging data from separate hyperspectral and hypertemporal systems, and thus, reduces the amount of any data that has to be downlinked for subsequent processing. Potential applications include not only infrastructure monitoring such as the bridge example identified above, but also transportation, asteroid detection, pollution monitoring, and utility monitoring.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An imaging apparatus comprising:
a micro-electro-mechanical system (MEMs) optical device being operable to switch an optical image input path between first and second optical image output paths;
a spectral imaging sensor aligned with the first optical image output path;
an imaging sensor aligned with the second optical image output path; and
a multiplexing controller configured to selectively operate said MEMs optical device to alternatingly collect spectral image data from said spectral imaging sensor and image data from said imaging sensor.

2. The imaging apparatus according to claim 1 wherein said MEMs optical device comprises a digital micromirror device (DMD) or a Grating Electro-Mechanical System (GEMS).

3. The imaging apparatus according to claim 1 wherein said MEMs optical device is configured to perform optical modulation of the input signal.

4. The imaging apparatus according to claim 1 wherein said spectral imaging sensor comprises a hyperspectral imaging sensor.

5. The imaging apparatus according to claim 1 wherein said imaging sensor comprises a hypertemporal imaging sensor.

6. The imaging apparatus according to claim 1 comprising at least one first optical element in the first optical image output path.

7. The imaging apparatus according to claim 6 wherein said at least one first optical element comprises a grating, a prism, or a dispersion element.

8. The imaging apparatus according to claim 1 comprising at least one second optical element in the second optical image output path.

9. The imaging apparatus according to claim 8 wherein said at least one second optical element comprises a filter and at least one lens associated therewith.

10. The imaging apparatus according to claim 1 comprising an optical tube assembly aligned with said MEMs optical device.

11. An imaging apparatus comprising:
a digital micromirror device (DMD) being operable to switch an optical image input path between first and second optical image output paths;
a hyperspectral imaging sensor aligned with the first optical image output path;
a hypertemporal imaging sensor aligned with the second optical image output path; and
a multiplexing controller configured to selectively operate said DMD to alternatingly collect hyperspectral image data from said hyperspectral imaging sensor and hypertemporal image data from said hypertemporal imaging sensor.

12. The imaging apparatus according to claim 11 comprising at least one first optical element in the first optical image output path.

13. The imaging apparatus according to claim 12 wherein said at least one first optical element comprises a grating, a prism, or a dispersion element.

14. The imaging apparatus according to claim 11 comprising at least one second optical element in the second optical image output path.

15. The imaging apparatus according to claim 14 wherein said at least one second optical element comprises a filter and at least one lens associated therewith.

16. The imaging apparatus according to claim 11 comprising an optical tube assembly aligned with said DMDs.

17. An imaging method comprising:
using a multiplexing controller to selectively operate a MEMs optical device to switch an optical image input path between first and second optical image output paths to alternatingly collect spectral image data from a spectral imaging sensor along the first optical image output path, and image data from an imaging sensor along the second optical image output path.

18. The method according to claim 17 wherein said MEMs optical device comprises a digital micromirror device (DMD) or a Grating Electro-Mechanical System (GEMS).

19. The method according to claim 17 wherein said spectral imaging sensor comprises a hyperspectral imaging sensor.

20. The method according to claim 17 wherein said imaging sensor comprises a hypertemporal imaging sensor.

21. The method according to claim 17 comprising at least one first optical element in the first optical image output path.

22. The method according to claim 17 comprising at least one second optical element in the second optical image output path.

23. The method according to claim 17 further comprising compressing a dynamic range by dithering the MEMs optical device by selectively controlling exposure levels at either the spectral imaging sensor or the imaging sensor.

* * * * *